United States Patent
Pinson et al.

(10) Patent No.: US 8,449,776 B2
(45) Date of Patent: May 28, 2013

(54) DENSITY ADJUSTMENT BY THE USE OF LIGHT CYCLE OIL, (LCO), FOR RECOVERY AND RECLAMATION OF SPILLED OIL FOLLOWING THE 2010 OFF-SHORE LEAK IN THE GULF

(76) Inventors: Guy Adelle Pinson, Grand Saline, TX (US); Barbara Pinson, Grand Saline, TX (US)

( * ) Notice: Subject to any disclaimer, the term of this patent is extended or adjusted under 35 U.S.C. 154(b) by 318 days.

(21) Appl. No.: 12/803,127

(22) Filed: Jun. 18, 2010

(65) Prior Publication Data

US 2011/0309028 A1   Dec. 22, 2011

(51) Int. Cl.
   *B01D 17/04* (2006.01)
(52) U.S. Cl.
   USPC ........... 210/708; 208/187; 210/776; 210/787; 210/925; 516/143
(58) Field of Classification Search
   USPC .............. 210/242.3, 776, 804, 922–925, 705, 210/708, 787; 208/177, 179, 180, 187, 188; 516/135, 141, 143
   See application file for complete search history.

(56) References Cited

U.S. PATENT DOCUMENTS

| | | | | |
|---|---|---|---|---|
| 5,478,483 | A  * | 12/1995 | Gore | 210/776 |
| 7,244,364 | B1 * | 7/2007 | Weber | 210/729 |
| 2006/0035793 | A1 * | 2/2006 | Goldman | 508/433 |

* cited by examiner

*Primary Examiner* — Joseph Drodge

(57) ABSTRACT

Our idea is a new procedure that can be used to clean up and recover oil from spills or oil leaking from damaged ships or rigs. The reclamation is accomplished by restoring the oil's light density. This is accomplished with density control by adding light cycle oil, (LCO), with a density of 0.82 g/ml, to the oil being recovered for the purpose of reprocessing in refineries. Recovery is made possible through the application of solubility rules found in organic chemistry. LCO is a mixture of many different molecular weight hydrocarbons that have many different numbers of carbons in their chains, branches, or rings. Each of these hydrocarbons dissolves a small part of the oil preparing the mixture for collection and reprocessing as refinery feedstock. Furthermore, this idea can prevent the need for landfill storage and offset the cost of recovery.

6 Claims, No Drawings

DENSITY ADJUSTMENT BY THE USE OF LIGHT CYCLE OIL, (LCO), FOR RECOVERY AND RECLAMATION OF SPILLED OIL FOLLOWING THE 2010 OFF-SHORE LEAK IN THE GULF

BACKGROUND

The problem of oil contamination in the Gulf Waters created the need for a working procedure that will allow recovery and reclamation by restoring the oil's light density. This is accomplished through density control by adding light cycle oil, LCO, (density of 0.82 g/ml) to the waste emulsion collected. This procedure will prepare for both the higher density non-floating oil and the floating oil emulsion that may be near the same density as salt water, for collection using skimmers or centrifuges.

DETAILED DESCRIPTION OF PROCEDURE

The solution to the problem of density control is through the use of LCO to adjust the density of the heavy oil and the oil emulsion. Applying solubility rules found in organic chemistry by adding LCO to the spilled oil allows recovery and reclamation. Other solvents such as aromatic distillate will not work. LCO will control the density because it is a mixture of many different molecular weight hydrocarbons having different numbers of carbons in their chains, branches, or rings. Each one of these dissolves a small part of the heavy oil and the next higher molecular weight hydrocarbon dissolves a heavier part, etc., until each of the LCO hydrocarbons dissolves a different part of the oil. The density of the resulting oil can be controlled by the amount of LCO added. The modified reclaimed solution can then be recovered through the use of skimmers or centrifuges. The order of intervention is as follows, *, ** indicate my ideas:

1. Oil leak in Gulf Water
2. Various methods of collecting floating and non-floating oil
3. Stored in ships, tanks, barges, as 'emulsion waste'
4. *Recovery: Add LCO to the emulsion waste preparing it for recovery of the mixture to be used as feed for refining and recover more than the cost of recovery and reclamation
5. **Reclamation: Adjust the density by this method to allow for further separation, then, using skimmers or centrifuges collect 'pure' oil for refining. Capturing the useable products is a value-added benefit of this idea; instead of sending the waste to landfills which will lead to contamination of not only the Gulf Waters but our freshwater, etc.

CONCLUSION

The patent-worthy component of my idea is based upon principles of organic chemistry solubility rules, 'like substances' dissolve 'like substances,' and using it to solve the problem of recovering and reclamation the oil waste emulsion. The application of this principle is that light hydrocarbon materials will only blend with heavy hydrocarbon materials if there are many different molecular weight hydrocarbons in the mixture and each one dissolves a specific component part of the heavy oil. Once the application of the principle is conceptualized, I feel confident this procedure will be useful to professionals such as process and chemical engineers faced with similar problems.

REFERENCES AND QUALIFICATIONS

I, Guy A. Pinson, am confident this procedure will work having previously applied my method to solve a similar problem while working as a Senior Research and Development Chemist and Senior Analyzer Engineer at E. I. duPont for 29 years. Following retirement from duPont, for the last ten years I have taught advanced placement chemistry and physics in high school and have applied for another patent using dual fuel selection and injection. I have attached a letter where E. I. duPont recognized the success of my idea which was implemented in their process. I can furnish the Test Authorization, TA #165 and 166, Procedure found in the DuPont Petrochemical Department at Sabine River Works dated Aug. 21, 1985. This idea was worth 12 million dollars/year. It was affirming that using my chemical method for Light Cycle Oil Injection solved a problem that PhD level professionals had worked for fourteen years. A CV is available.

Dr. Barbara Pinson has a Masters Degree of Environmental Science and is Board Certified in Occupational and Preventive Medicine and Board Eligible in Family Practice. She has served as staff physician and professor at The University of Texas Health Science Center in Tyler, Tex. teaching toxicology, epidemiology, social and behavioral aspects of environmental health, CV available on request. Presently, she works as medical consultant on a grant funded program for the Departments of Energy and Labor with Pantex DOE site former nuclear weapons workers.

The invention claimed is:

1. A method for recovery and reclamation of spilled heavy oils and oils present in emulsions from oil spills, comprising:
    a) collecting a waste emulsion comprising spilled oil;
    b) adding an oil having a density of about 0.82 g/ml to the collected waste emulsion, comprising light cycle oil (LCO) having a density of about 0.82 g/ml, to create a reclaimed solution; and
    c) separating the reclaimed solution so as to recover the spilled heavy oils in a sufficiently pure state to allow refining of the spilled heavy oils.

2. The method of claim 1, wherein the separating comprises one of skimming or centrifuging.

3. The method of claim 1, wherein the adding of LCO is effective to reduce the density of the reclaimed solution to below 0.96 g/ml.

4. The method of claim 1, wherein the reclaimed solution comprises tar balls, and optionally, collecting the tar balls in a shipping container.

5. The method of claim 1, wherein the separating results in a separated water layer, and draining the water layer.

6. The method of claim 1, wherein the LCO comprises a wide range of organic compounds, operative for allowing solubility of all oil components present in the spilled heavy oils.

* * * * *